US012685396B1

(12) United States Patent     (10) Patent No.:   US 12,685,396 B1

Dekerrie                (45) Date of Patent:      Jul. 21, 2026

(54) FIRE RETARDANT PILLOW

(71) Applicant: Matthew Morrie Dekerrie, Spanaway, WA (US)

(72) Inventor: Matthew Morrie Dekerrie, Spanaway, WA (US)

( * ) Notice: Subject to any disclaimer, the term of this patent is extended or adjusted under 35 U.S.C. 154(b) by 9 days.

(21) Appl. No.: 18/592,607

(22) Filed: Mar. 1, 2024

(51) Int. Cl.
| | |
|---|---|
| *A47C 31/00* | (2006.01) |
| *A47G 9/10* | (2006.01) |
| *B32B 3/18* | (2006.01) |
| *B32B 5/02* | (2006.01) |
| *B32B 9/02* | (2006.01) |
| *B32B 9/04* | (2006.01) |
| *B32B 27/08* | (2006.01) |
| *B32B 27/12* | (2006.01) |
| *B32B 27/34* | (2006.01) |

(52) U.S. Cl.
CPC .............. *A47C 31/001* (2013.01); *A47G 9/10* (2013.01); *B32B 3/18* (2013.01); *B32B 5/02* (2013.01); *B32B 9/025* (2013.01); *B32B 9/047* (2013.01); *B32B 27/08* (2013.01); *B32B 27/12* (2013.01); *B32B 27/34* (2013.01); *B32B 2262/0269* (2013.01); *B32B 2262/062* (2013.01); *B32B 2307/3065* (2013.01); *B32B 2479/00* (2013.01)

(58) Field of Classification Search
CPC ............ A47C 31/001; A47G 9/10; B32B 3/18

USPC ............................................................ 5/636
See application file for complete search history.

(56) References Cited

U.S. PATENT DOCUMENTS

| | | | | |
|---|---|---|---|---|
| 11,559,151 | B2 * | 1/2023 | Russell ................. | A47G 9/007 |
| 2015/0164251 | A1 * | 6/2015 | Hsu ........................ | A45C 11/00 |
| | | | | 224/577 |
| 2023/0115100 | A1 * | 4/2023 | Lim ....................... | A47C 27/15 |
| | | | | 5/636 |
| 2023/0391046 | A1 * | 12/2023 | Van Schalkwyk ........ | B32B 5/02 |
| 2024/0033702 | A1 * | 2/2024 | Guillaneuf ............. | A01N 25/06 |

FOREIGN PATENT DOCUMENTS

| | | | | |
|---|---|---|---|---|
| DE | 202004017214 U1 * | 1/2005 | ............... | A47G 9/10 |

* cited by examiner

*Primary Examiner* — David R Hare
*Assistant Examiner* — Joseane E. Tejada
(74) *Attorney, Agent, or Firm* — Plager Schack LLP; Mark H. Plager; Kara K. Verryt

(57) ABSTRACT

A fire retardant pillow for protecting against and controlling fires resulting from a malfunctioning electronic device may include a pillow body having a layered construction and a pocket extending into a central region of the pillow body. The layered construction may be made of an outer fabric covering; an inner fabric layer lining the pocket; and a fire retardant layer positioned between the inner fabric layer and the outer fabric covering. The layered construction may further include an aramid fiber layer positioned between the inner fabric layer and the fire retardant layer; and a Faraday material layer positioned between the aramid fiber layer and the inner fabric layer.

11 Claims, 3 Drawing Sheets

FIRE RETARDANT PILLOW

BACKGROUND

The embodiments herein relate generally to fire safety devices, and more particularly, to a fire retardant pillow to cover and control explosions or fires resulting from malfunctioning electronic devices.

Malfunctioning electronic devices can result in an unexpected fire or explosion. With the increase of personal electronic devices, particularly those including lithium ion batteries, the danger of fire in the home or office, and even in public and private transportation, is continuing to increase. Conventionally, there are not easily and quickly accessible devices for protection and control of cell phone and laptop fires.

Therefore, what is needed is a fire retardant pillow designed to protect users and environments from fires and explosions caused by malfunctioning electronic devices.

SUMMARY

Some embodiments of the present disclosure include a fire retardant pillow for protecting against and controlling fires resulting from a malfunctioning electronic device. The fire retardant pillow may include a pillow body having a layered construction and a pocket extending into a central region of the pillow body. The layered construction may be made of an outer fabric covering; an inner fabric layer lining the pocket; and a fire retardant layer positioned between the inner fabric layer and the outer fabric covering. The layered construction may further include an aramid fiber layer positioned between the inner fabric layer and the fire retardant layer; and a Faraday material layer positioned between the aramid fiber layer and the inner fabric layer.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a fire retardant pillow for protecting against and controlling fires resulting from malfunctioning electronic devices and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The elements of the device of the present disclosure may be related in the following exemplary fashion. It is not intended to limit the scope or nature of the relationships between the various elements and the following examples are presented as illustrative examples only.

Figure 1:
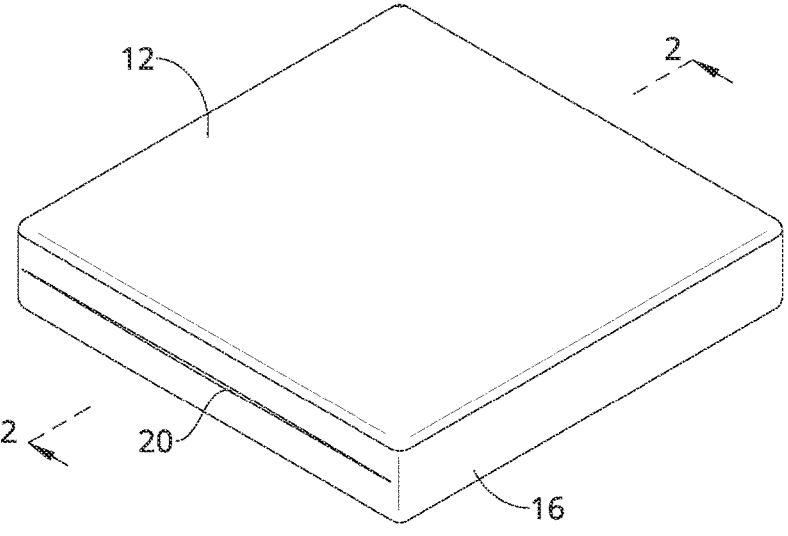
FIG. 1 is a perspective view of one embodiment of the present disclosure, shown with a portion cut away.
Figure 2:
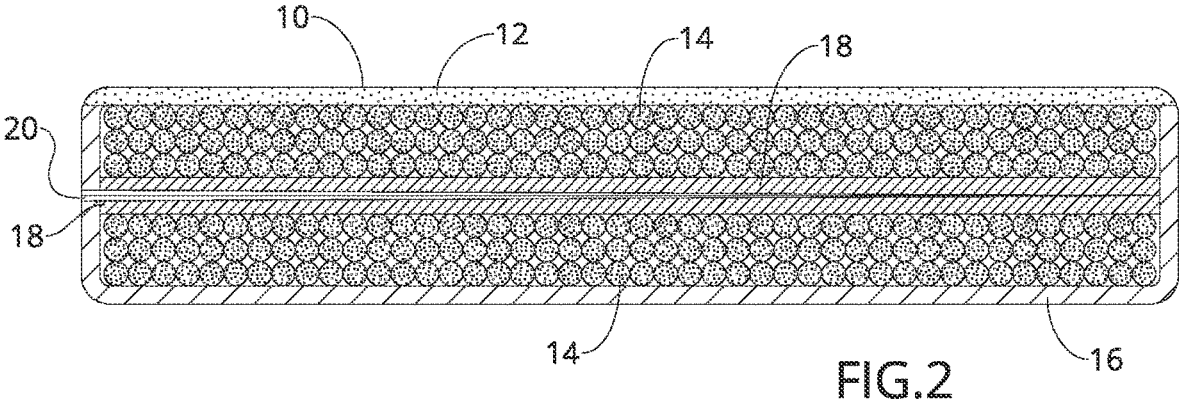
FIG. 2 is a section view of one embodiment of the present disclosure, taken along line 2-2 in FIG. 1.
Figure 3:
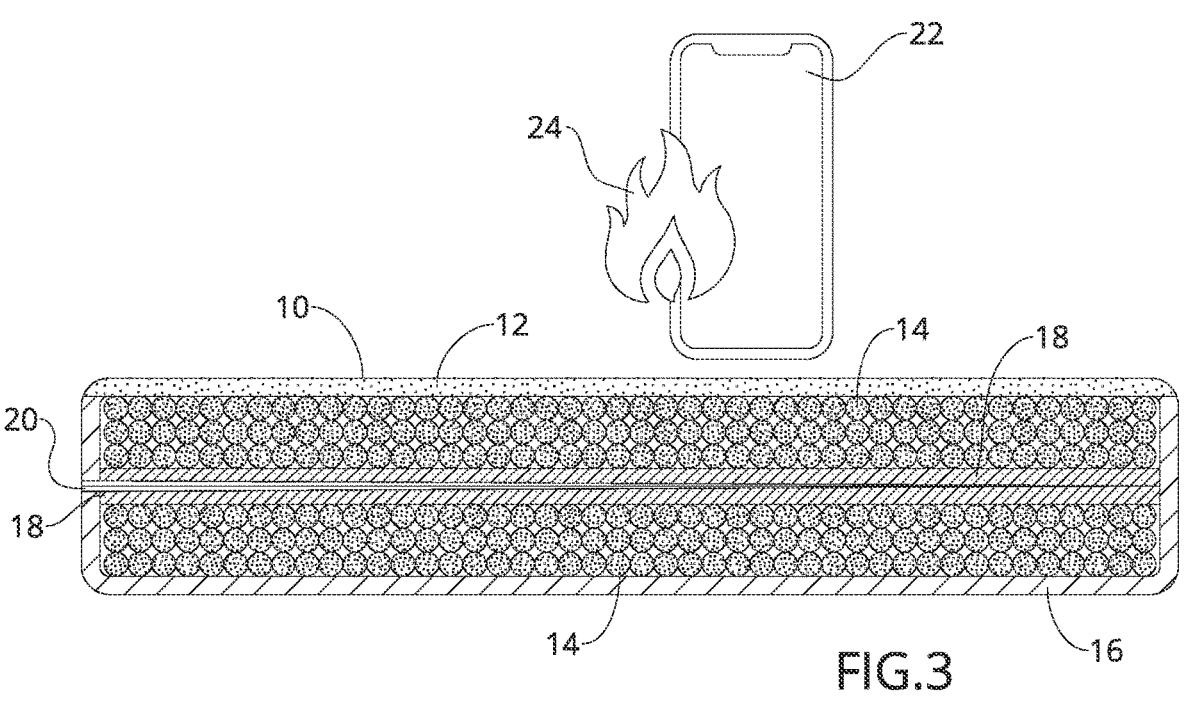
FIG. 3 is a schematic section view of one embodiment of the present disclosure, showing an exemplary electronic device on fire.
Figure 4:
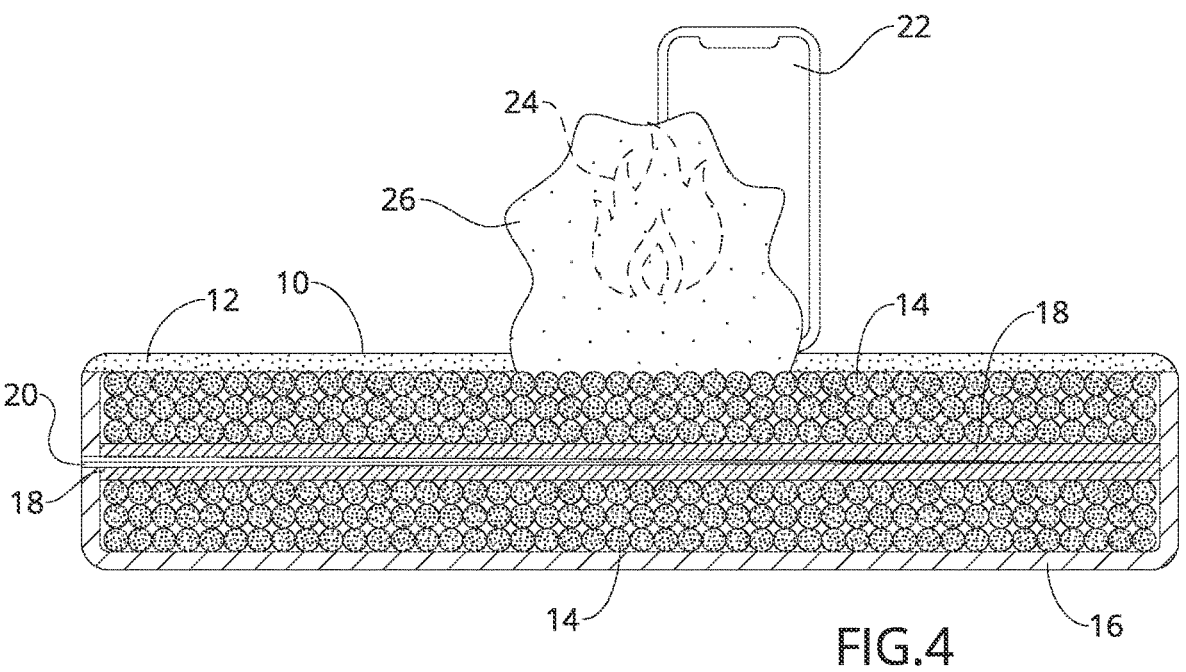
FIG. 4 is a schematic section view of one embodiment of the present disclosure, showing activated fire retardant.
Figure 5:
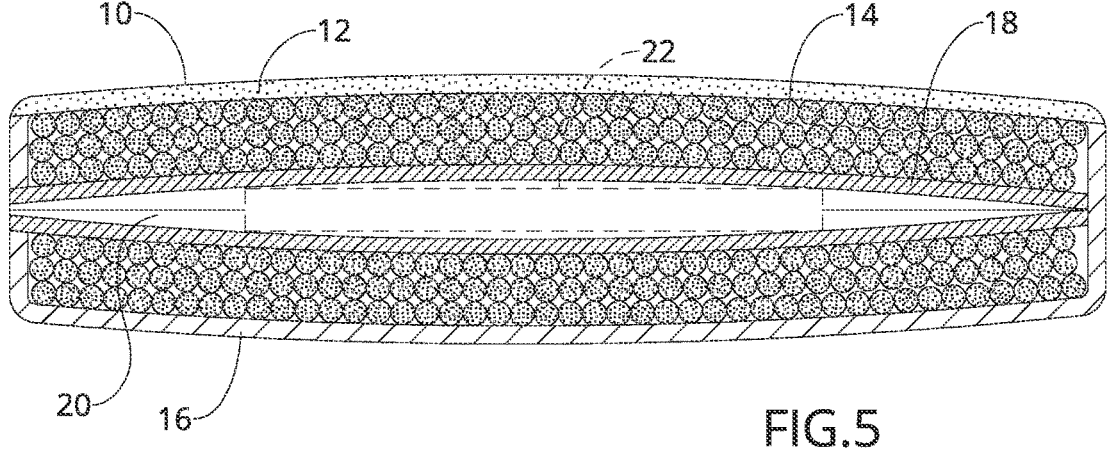
FIG. 5 is a section view of one embodiment of the present disclosure, showing an exemplary device inserted therein.
Figure 6:
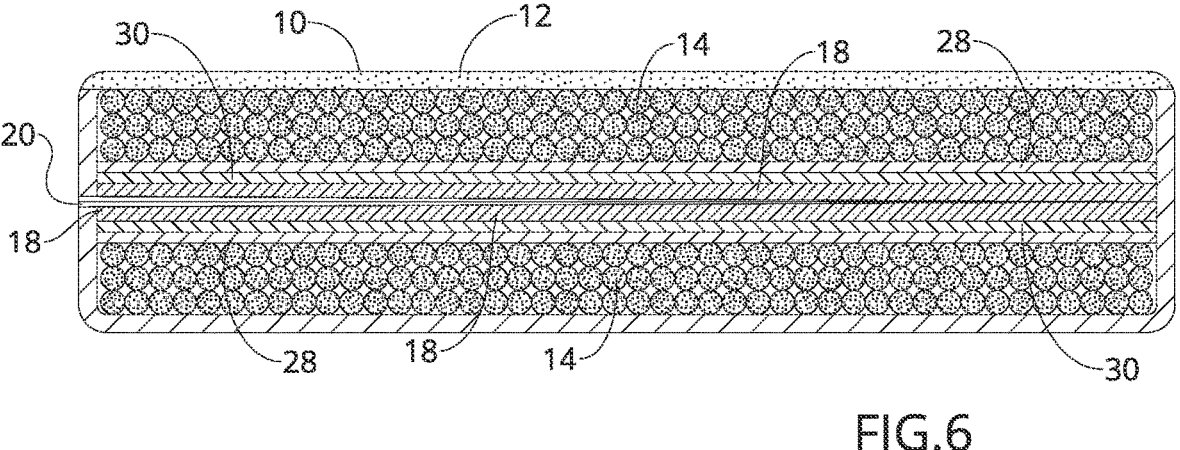
FIG. 6 is a perspective view of one embodiment of the present disclosure.

By way of example, and referring to FIGS. 1-6, some embodiments of the present disclosure include a fire retardant pillow for protecting against and controlling fires resulting from a malfunctioning electronic device 22, the pillow comprising a pillow body having a layered construction, and a pocket 20 extending into a central region of the pillow body, wherein the layered construction comprises a outer fabric covering, an inner fabric layer 18 lining the pocket 20, and a fire retardant layer 14 positioned between the inner fabric layer 18 and the outer fabric covering. In embodiments, the fire retardant layer 14 may comprise a plurality of breakable members, such as plastic or glass tubes or beads, each containing a volume of a fire retardant material. In some embodiments, the beads or tubes may be positioned within a plastic diaphragm to better stabilize their positioning within the pillow body.

In embodiments, the outer fabric covering may comprise a first outer covering 10 covering a top surface of the pillow body and a second outer covering 16 covering the side surfaces and the bottom surface of the pillow body. In some embodiments, the pillow may further comprise an aramid layer 12 positioned between the first outer covering 10 and the fire retardant layer 14.

The pillow of the present disclosure may comprise additional protective layers. Specifically, embodiments of the pillow may comprise a Faraday material layer 30 positioned between the inner fabric layer 18 and the fire retardant layer 14, wherein the Faraday material layer 30 may protect a user from harmful radiation when an electronic device 22 is placed within the pocket 20. The pillow may comprise an aramid fiber layer 28, such as KEVLAR brand aramid fibers, positioned between the inner fabric layer 18 and the fire retardant layer 14, wherein the aramid fiber layer 28 may protect a user from explosions. In some embodiments, the pillow may comprise both a Faraday material layer 30 and an aramid fiber layer 28 positioned between the inner fabric layer 18 and the fire retardant layer 14. For example, the pillow may comprise the aramid fiber layer 28 positioned between the inner fabric layer 18 and the fire retardant layer 14 and the Faraday material layer 30 positioned between the aramid fiber layer 28 and the inner fabric layer 18.

The pillow of the present disclosure may be made of various materials, as explained above. In a particular embodiment, the first outer covering 10 may comprise a leather material, the second outer covering 16 may comprise a cotton or cotton blend material, and the inner fabric layer 18 may comprise a cotton or cotton blend material. The other layers may comprise the exemplary materials previously mentioned.

The pillow of the present disclosure may have any desired and suitable size. For example, the pillow may range from having a length of from about 10 inches to about 16 inches, wherein the smaller pillows may be suitable for use with a smaller electronic device 22, such as a cell phone, and the larger pillows may be suitable for use with a larger electronic device 22, such as a tablet or laptop.

To use the pillow of the present disclosure, a user may place an electronic device 22 within the pocket 20 or may simply cover the electronic device 22 with the pillow. A malfunctioning electronic device, such as one emitting a fire 24, may be covered by or placed within the pillow, wherein placing pressure on the pillow may cause the fire retardant layer 14 to release activated fire retardant 26, which may stifle or put out the fire 24.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A fire retardant pillow for protecting against and controlling fires resulting from a malfunctioning electronic device, the pillow comprising:

a pillow body having a layered construction; and a pocket extending into a central region of the pillow body, wherein the layered construction comprises:

an outer fabric covering;

an inner fabric layer lining the pocket and fastened to the outer fabric covering, thus forming a compartment therebetween; and a fire retardant layer positioned within the compartment between the inner fabric layer and the outer fabric covering.

2. The fire retardant pillow of claim 1, wherein the fire retardant layer comprises a plurality of breakable members, the plurality of breakable members each containing a volume of a fire retardant material.

3. The fire retardant pillow of claim 2, wherein the plurality of breakable members are positioned within a plastic diaphragm.

4. The fire retardant pillow of claim 1, wherein the outer fabric covering comprises a first outer covering configured to cover a top surface of the pillow body and a second outer covering configured to cover side surfaces and a bottom surface of the pillow body.

5. The fire retardant pillow of claim 4, wherein:

the first outer covering comprises a leather material; and the second outer covering comprises a cotton material.

6. The fire retardant pillow of claim 4, further comprising an aramid layer positioned between the first outer covering and the fire retardant layer.

7. The fire retardant pillow of claim 1, further comprising a Faraday material layer positioned between the inner fabric layer and the fire retardant layer.

8. The fire retardant pillow of claim 1, further comprising an aramid fiber layer positioned between the inner fabric layer and the fire retardant layer.

9. The fire retardant pillow of claim 1, further comprising:

an aramid fiber layer positioned between the inner fabric layer and the fire retardant layer; and a Faraday material layer positioned between the aramid fiber layer and the inner fabric layer.

10. The fire retardant pillow of claim 1, wherein the inner fabric layer comprises a cotton material.

11. A fire retardant pillow for protecting against and controlling fires resulting from a malfunctioning electronic device, the pillow comprising:

a pillow body having a layered construction; and a pocket extending into a central region of the pillow body, wherein:

the layered construction comprises:

an outer fabric covering defining an exterior layer of the pillow body;

an inner fabric layer lining the pocket and fastened to the outer fabric covering, thus forming a compartment therebetween; and a fire retardant layer positioned within the compartment between the inner fabric layer and the outer fabric covering; and the fire retardant layer comprises a plurality of breakable members, the plurality of breakable members each containing a volume of a fire retardant material.

* * * * *